J. WATERS.
Improvement in Fruit Gatherers.
No. 124,464.　　　　　　　　　　　Patented March 12, 1872.
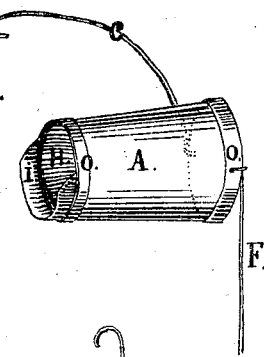
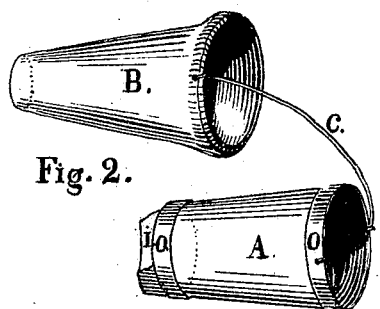
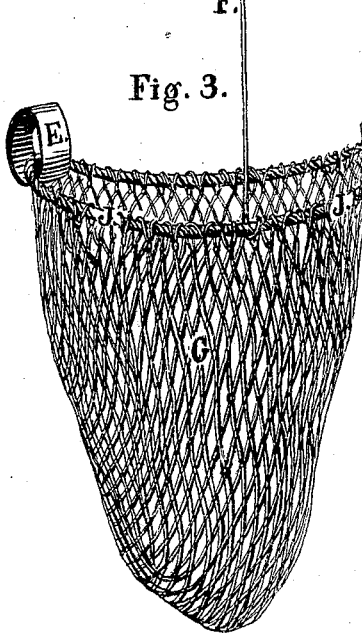
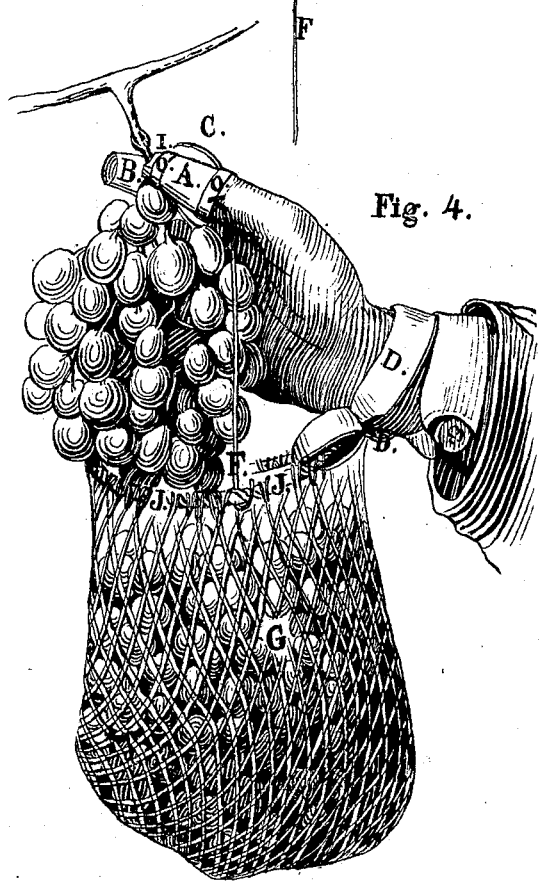
WITNESSES:
Wm. F. Browne
Oliver C. Brown
INVENTOR:
Jason Waters

124,464

UNITED STATES PATENT OFFICE.

JASON WATERS, OF WEST SUTTON, MASSACHUSETTS.

IMPROVEMENT IN FRUIT-GATHERERS.

Specification forming part of Letters Patent No. 124,464, dated March 12, 1872.

Specification describing an Implement for Plucking Fruits, Flowers, &c., invented by JASON WATERS, of West Sutton, county of Worcester and State of Massachusetts.

The first part of my invention relates to a thimble-knife attached to the thumb, finger, or fingers of either hand, in combination with a finger-shield attached to another finger of the hand, in such a manner that fruits or flowers may be plucked while being held in the hand; also, to corrugations on the body of the thimble-knife, by which fruits or flowers plucked may be held suspended by their stems. The second part of my invention relates to the combination of the thimble-knife and finger-shield for plucking fruits, flowers, &c., and holding them suspended by their stems, combined with a receptacle attached to the thimble-knife, wrist, and hand in such a manner as to receive the fruits or flowers when plucked.

In the annexed drawing, Figure 1 is the thimble-knife and its connecting braces. Fig. 2 is the figer-shield attached to the thimble-knife. Fig. 3 is the receptacle with fastening-brace and bands attached. Fig. 4 is the thimble-knife upon the thumb, the shield upon the finger, and the receptacle attached to the thimble-knife, wrist, and hand, representing one manner of plucking fruit and depositing the same in the receptacle.

A is the thimble-knife, which consists of a tube or ring; but may consist of several rings connected together, constructed in such form as to admit the thumb or one or more fingers of either hand, the aperture of which is partially or wholly closed near the apex by a bar or partition, H, to prevent the end of the thumb or fingers from protruding. The apex terminates in the knife I, which projects beyond the bar or partition H; but the knife may be attached to any part of the body of the thimble, and may extend entirely around the same. O O are the corrugations, to prevent the articles plucked from escaping the grasp, their stems becoming indented by being pressed against the corrugations with the finger or fingers against which they rest. B is the finger-shield, a tube composed of gutta-percha or other suitable material, into which the fingers or thumb are inserted to protect the same from the edge of the knife, and the abrasion and friction of the stems of the fruit or articles plucked. C is the brace that attaches the base of the thimble-knife to the base of the finger-shield, to prevent the thimble-knife from falling to the ground should it become detached from the thumb or fingers, and also to assist in sustaining the receptacle by its connection therewith through the thimble-knife by the brace F. G is the receptacle for the fruit or other articles plucked. J J is the flexible rim, made of metallic cord, which may be compressed into any desirable shape, where it will remain by its own inelasticity until changed, and it is self-adjusting to the edge of the hand with which it is brought in contact when adjusted for use, as in Fig. 4. D is the band, which is attached to the rim of the receptacle, and fastens it to the wrist. E is the band, attached to the rim of the receptacle, and fastens it to a finger. F is a brace, which is attached to the opposite side of the rim from the finger-band, and extends upward and connects by a hook with the base of the thimble-knife, from which it may be detached at pleasure.

The ordinary manner of using this implement is to attach the band D to the wrist by the aid of the buckle attached thereto, and inserting the third finger into the band E. The first finger is inserted into the finger-shield B, and the thumb into the thimble-knife A, with the edge of the knife toward the finger-shield B. By grasping the stem of the article to be plucked between the thumb and first finger, while the article itself is sustained by the palm of the hand, a simple movement of the thumb brings the edge of the knife in contact with the stem, which, being pressed against the finger protected by the shield, is severed from the parent stock. As the stem is severed the edge of the knife passes over the top of the finger-shield, bringing the corrugations of the thimble-knife O O in contact with the stem of the detached fruit or other article, and can be held thereby suspended, or may be immediately dropped into the receptacle at the will of the operator. In plucking scions, the twigs of trees, shrubs, and plants containing the larvæ of insects, and also many varieties of fruits and flowers, the receptacle may be detached from the thimble-knife, and its use dispensed with, while the articles plucked can be held in the hand suspended by their stems by being compressed between the corrugations of the thimble-knife, and the fingers against which they rest, until released by the withdrawal of the pressure of the thumb or finger wearing the thimble-knife.

1. I claim as my invention, the thimble-knife, constructed in the manner substantially as described.

2. I claim as my invention, the finger-shield, in combination with the thimble-knife, substantially as set forth.

3. I claim as my invention, the flexible and inelastic rimmed receptacle, in combination with the thimble-knife and finger-shield, constructed in the manner and for the purposes substantially as described.

JASON WATERS.

Witnesses:
WM. F. BROWNE,
OLIVER C. BROWN.